US007082927B2

(12) United States Patent
Miyashita

(10) Patent No.: US 7,082,927 B2
(45) Date of Patent: Aug. 1, 2006

(54) METHOD AND APPARATUS FOR CONTROLLING FUEL INJECTION IN INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/144,605

(22) Filed: Jun. 6, 2005

(65) Prior Publication Data

US 2005/0274359 A1 Dec. 15, 2005

(30) Foreign Application Priority Data

Jun. 10, 2004 (JP) ............................ 2004-172375

(51) Int. Cl.
*F02B 7/00* (2006.01)
*G06F 19/00* (2006.01)

(52) U.S. Cl. ...................... 123/431; 123/481; 123/757; 123/300; 123/198 DB

(58) Field of Classification Search ........ 123/299–300, 123/304–305, 431, 481, 491–493; 701/103–105, 701/112
See application file for complete search history.

(56) References Cited

U.S. PATENT DOCUMENTS

| | | | | |
|---|---|---|---|---|
| 6,257,194 | B1 * | 7/2001 | Kerns et al. | 123/198 D |
| 6,318,334 | B1 * | 11/2001 | Reale et al. | 123/198 DB |
| 6,425,365 | B1 * | 7/2002 | Peters et al. | 123/198 DB |
| 6,938,606 | B1 * | 9/2005 | Chung et al. | 123/198 DB |
| 2001/0009149 | A1 | 7/2001 | Hirata et al. | |
| 2002/0043243 | A1 | 4/2002 | Majima | |
| 2003/0051707 | A1 * | 3/2003 | Pilgram et al. | 123/431 |
| 2005/0166896 | A1 * | 8/2005 | Sadakane et al. | 123/431 |
| 2005/0235960 | A1 * | 10/2005 | Oomori | 123/431 |

FOREIGN PATENT DOCUMENTS

| | | |
|---|---|---|
| EP | 1 515 031 A2 | 3/2005 |
| JP | A 02-119669 | 5/1990 |
| JP | A 07-103048 | 4/1995 |
| JP | A 2001-342876 | 12/2001 |
| JP | A 2002-004985 | 1/2002 |
| JP | A 2002-364409 | 12/2002 |
| WO | WO 2004/063546 A1 | 7/2004 |

* cited by examiner

*Primary Examiner*—Hai Huynh
(74) *Attorney, Agent, or Firm*—Oliff & Berridge, PLC

(57) ABSTRACT

When an internal combustion engine is stopped, a ratio of a quantity of fuel injection from an in-cylinder fuel injection valve to the total fuel injection quantity is increased and a ratio of a quantity of fuel injected from a manifold fuel injection valve to the total fuel injection quantity is decreased. Thereafter, the internal combustion engine is stopped. In this manner, a quantity of fuel adhered to an intake manifold when the internal combustion engine is stopped is reduced, and deterioration in emission can be suppressed.

8 Claims, 4 Drawing Sheets

METHOD AND APPARATUS FOR CONTROLLING FUEL INJECTION IN INTERNAL COMBUSTION ENGINE

This nonprovisional application is based on Japanese Patent Application No. 2004-172375 filed with the Japan Patent Office on Jun. 10, 2004, the entire contents of which are hereby incorporated by reference.

BACKGROUND OF THE INVENTION

1. Field of the Invention

The present invention relates to method and apparatus for controlling fuel injection in an internal combustion engine, and more particularly to method and apparatus for controlling fuel injection in an internal combustion engine including an in-cylinder fuel injection valve for injecting a fuel into a cylinder and a manifold fuel injection valve for injecting a fuel into an intake manifold.

2. Description of the Background Art

A technique to provide a pressure-lowering pipe between a fuel supply pipe for supplying a fuel to a fuel injection valve and a drain pipe in an internal combustion engine including an in-cylinder fuel injection valve for injecting the fuel into a cylinder has been known (for example, see Japanese Patent Laying-Open Nos. 2-119669, 7-103048, 2001-342876, and 2002-4985). In such an internal combustion engine, if the pressure inside the in-cylinder fuel injection valve is raised due to volume expansion of the fuel present therein as a result of heat from the internal combustion engine when it is stopped after warm-up, the pressure inside the in-cylinder fuel injection valve is lowered by opening the pressure-lowering pipe.

In the internal combustion engine including the in-cylinder fuel injection valve for injecting the fuel into the cylinder and the manifold fuel injection valve for injecting the fuel into the intake manifold, when the internal combustion engine is stopped while the fuel is being injected from the manifold fuel injection valve, the internal combustion engine stops with some fuel injected from the manifold fuel injection valve being adhered to the intake manifold.

The fuel adhered to the intake manifold may evaporate while the internal combustion engine is not running, and may be exhausted to the outside through an intake system. In addition, the adhered fuel that has evaporated while the internal combustion engine is not running may be exhausted to the outside through an exhaust system during cranking for re-starting the internal combustion engine. If the internal combustion engine is stopped with the fuel being adhered to the intake manifold, emission may be deteriorated.

SUMMARY OF THE INVENTION

An object of the present invention is to provide a technique with which deterioration of emission in an internal combustion engine including an in-cylinder fuel injection valve and a manifold fuel injection valve can be suppressed by reducing a quantity of fuel adhered to an intake manifold when the internal combustion engine is stopped.

According to the present invention, in stopping the internal combustion engine including the in-cylinder fuel injection valve and the manifold fuel injection valve, the internal combustion engine is stopped only after a ratio of a quantity of fuel injected from the in-cylinder fuel injection valve to the total fuel injection quantity is increased and a ratio of a quantity of fuel injected from the manifold fuel injection valve to the total fuel injection quantity is decreased.

Specifically, a method of controlling fuel injection in an internal combustion engine including an in-cylinder fuel injection valve for injecting a fuel into a cylinder and a manifold fuel injection valve for injecting a fuel into an intake manifold according to the present invention includes the steps of: when a condition for stopping the internal combustion engine is satisfied, increasing a ratio of a quantity of fuel injected from the in-cylinder fuel injection valve (hereinafter, referred to as an in-cylinder fuel injection quantity) to the total fuel injection quantity than before the condition is satisfied; decreasing a ratio of a quantity of fuel injected from the manifold fuel injection valve (hereinafter, referred to as a port fuel injection quantity) to the total fuel injection quantity than before the condition is satisfied; and stopping fuel injection from the in-cylinder fuel injection valve and the manifold fuel injection valve after a predetermined time has elapsed.

Here, the total fuel injection quantity represents the sum of the in-cylinder fuel injection quantity and the port fuel injection quantity.

According to the present invention, the internal combustion engine is stopped only after the port fuel injection quantity is decreased. The internal combustion engine continues to run until the predetermined time has elapsed since decrease in the port fuel injection quantity. Accordingly, during a period from a time point when the condition for stopping the internal combustion engine is satisfied until the predetermined time elapses, some fuel that has adhered to the intake manifold can flow into the cylinder. Therefore, the quantity of fuel adhered to the intake manifold when the internal combustion engine is stopped can be reduced, and deterioration in emission can be suppressed.

In the present invention, the condition for stopping the internal combustion engine may be such conditions as turn-off of ignition by a driver, an automatic stop condition of the internal combustion engine in an eco-run system or a hybrid system, and the like.

The predetermined time may be a time set in advance, or a time at which the quantity of fuel adhered to the intake manifold can be determined as not larger than a predetermined quantity.

According to the present invention, when a condition for stopping the internal combustion engine is satisfied, fuel injection from the manifold fuel injection valve may be stopped in order to allow fuel injection solely from the in-cylinder fuel injection valve, and fuel injection from the in-cylinder fuel injection valve may be stopped after a predetermined time has elapsed.

As a result of control in such a manner, further adhesion of the fuel to the intake manifold after the condition for stopping the internal combustion engine is satisfied is avoided. Therefore, the quantity of fuel adhered to the intake manifold when the internal combustion engine is stopped can further be reduced.

In addition, according to the present invention, when the condition for stopping the internal combustion engine is satisfied, it is preferable to lower a fuel pressure in a fuel supply portion supplying the fuel to the in-cylinder fuel injection valve than a pressure before the condition is satisfied.

As the fuel pressure in the fuel supply portion when the internal combustion engine is stopped is higher, the quantity of fuel leakage from the in-cylinder fuel injection valve after the internal combustion engine is stopped is increased, which is likely to cause deterioration in emission.

As a result of control as described above, the fuel pressure in the fuel supply portion after the internal combustion engine is stopped can be lowered. Therefore, the quantity of fuel leakage from the in-cylinder fuel injection valve after the internal combustion engine is stopped can be suppressed. Consequently, deterioration in emission can be suppressed.

In lowering the fuel pressure in the fuel supply portion, the fuel pressure should be lowered to a value within a range permitting the fuel injected from the in-cylinder fuel injection valve to burn.

If fuel injection from the manifold fuel injection valve is carried out even after the condition for stopping the internal combustion engine is satisfied, the fuel pressure not only in the fuel supply portion for supplying the fuel to the in-cylinder fuel injection valve but also the fuel pressure in the fuel supply portion for supplying the fuel to the manifold fuel injection valve may be lowered.

According to the method of controlling fuel injection in the internal combustion engine of the present invention, in the internal combustion engine including the in-cylinder fuel injection valve and the manifold fuel injection valve, fuel adhered to the intake manifold when the internal combustion engine is stopped can be reduced, and deterioration of emission can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of method and apparatus for controlling fuel injection in an internal combustion engine according to the present invention will be described hereinafter with reference to the drawings.

First Embodiment

<Overall Configuration of Internal Combustion Engine and Fuel Supply System Thereof>

Figure 1:
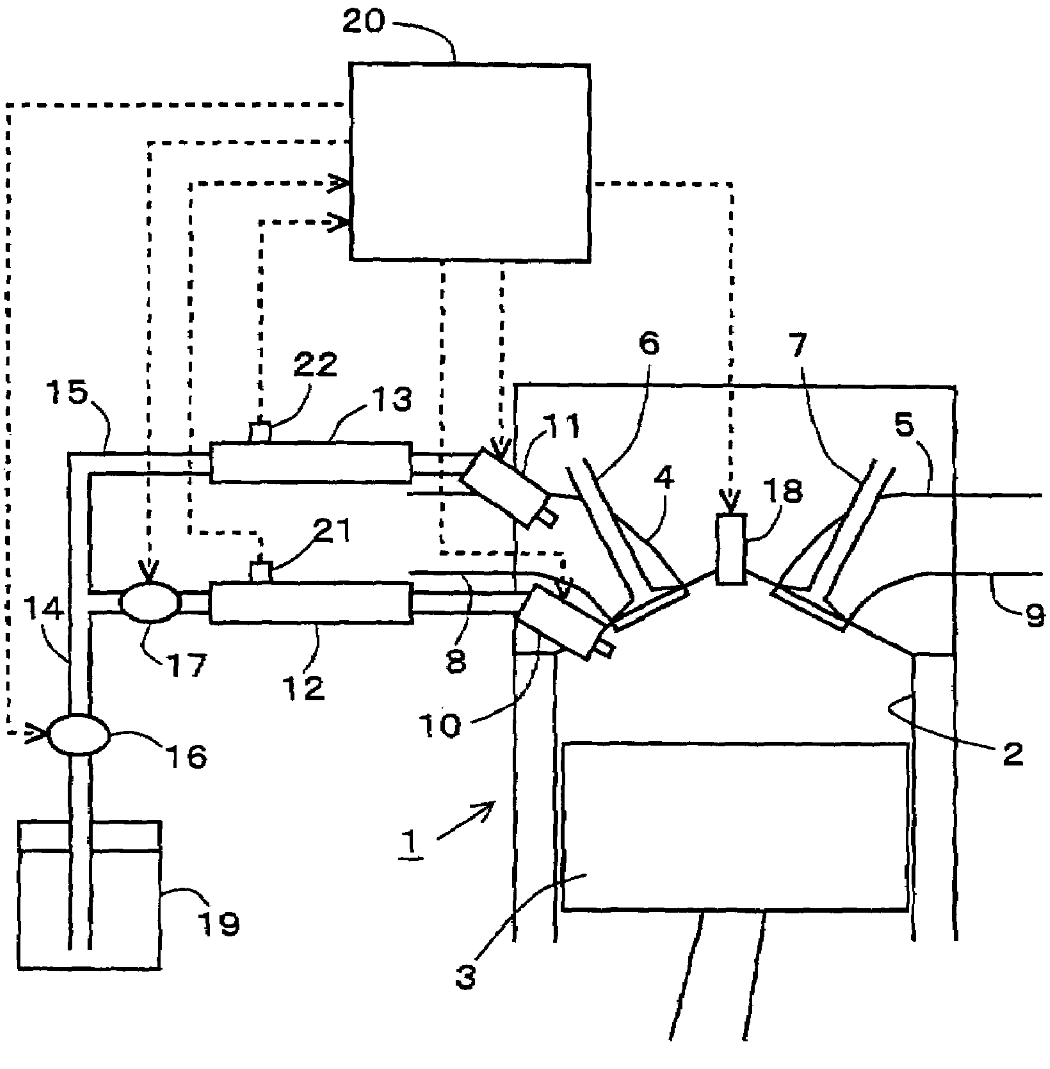
FIG. 1 shows an overall configuration of an internal combustion engine and a fuel supply system thereof according to an embodiment of the present invention.

Initially, the first embodiment of the method and apparatus for controlling fuel injection in the internal combustion engine according to the present invention will be described. FIG. 1 shows a schematic configuration of the internal combustion engine and the fuel supply system thereof according to the present embodiment. An internal combustion engine 1 is a 4-cylinder gasoline engine having four cylinders 2. Pistons 3 are slidably provided in respective cylinders 2. An intake port 4 and an exhaust port 5 are connected to a combustion chamber in an upper portion of cylinder 2. Opening portions of intake port 4 and exhaust port 5 to the combustion chamber are opened and closed by an intake valve 6 and an exhaust valve 7 respectively. Intake port 4 and exhaust port 5 are connected to an intake manifold 8 and an exhaust manifold 9 respectively.

Internal combustion engine 1 is provided with an in-cylinder fuel injection valve 10 for injecting the fuel into cylinder 2 and a port fuel injection valve 11 for injecting the fuel into intake port 4 in a direction toward the opening to the combustion chamber. In addition, a spark plug 18 for igniting an air-fuel mixture formed in the combustion chamber protrudes in the combustion chamber in the upper portion of cylinder 2.

Internal combustion engine 1 is also provided with a fuel tank 19. One end of a first fuel supply pipe 14 is inserted in fuel tank 19, and the other end of first fuel supply pipe 14 is connected to a first delivery pipe 12 supplying the fuel to in-cylinder fuel injection valve 10 of each cylinder 2. In addition, one end of a second fuel supply pipe 15 is connected to some midpoint of first fuel supply pipe 14, and the other end of second fuel supply pipe 15 is connected to a second delivery pipe 13 supplying the fuel to port fuel injection valve 11 of each cylinder 2.

A first fuel pump 16 for delivering the fuel from a side of fuel tank 19 to a side of first delivery pipe 12 and second delivery pipe 13 is provided on a side upstream of a connection portion of first fuel supply pipe 14 and second fuel supply pipe 15 (on the side of fuel tank 19). In addition, a second fuel pump 17 for delivering the fuel from the side of fuel tank 19 to the side of first delivery pipe 12 is provided on a side downstream of the connection portion of first fuel supply pipe 14 and second fuel supply pipe 15 (on the side of fuel delivery pipe 12).

Moreover, a first fuel pressure sensor 21 and a second fuel pressure sensor 22 outputting an electric signal corresponding to fuel pressure within respective delivery pipes 12, 13 are provided in first delivery pipe 12 and second delivery pipe 13, respectively.

Internal combustion engine 1 configured as described above is also provided with an ECU 20 for controlling internal combustion engine 1. ECU 20 is a unit for controlling a running state of internal combustion engine 1 in accordance with a condition for running internal combustion engine 1 or a request from the driver. ECU 20 is connected to a variety of sensors such as first fuel pressure sensor 21 and second fuel pressure sensor 22 through electric wiring, and ECU 20 receives output signals from these sensors.

In addition, ECU 20 is electrically connected to in-cylinder fuel injection valve 10, port fuel injection valve 11, spark plug 18, first fuel pump 16, and second fuel pump 17, so as to control the same. While internal combustion engine 1 is running, normally, not only the first fuel pump but also second fuel pump 17 supply the fuel to first delivery pipe 12 in order to increase fuel supply thereto, whereby the fuel pressure within first delivery pipe 12 is controlled to be higher than that within second delivery pipe 13.

<Fuel Injection Control 1 when Engine is Stopped>

Figure 2:
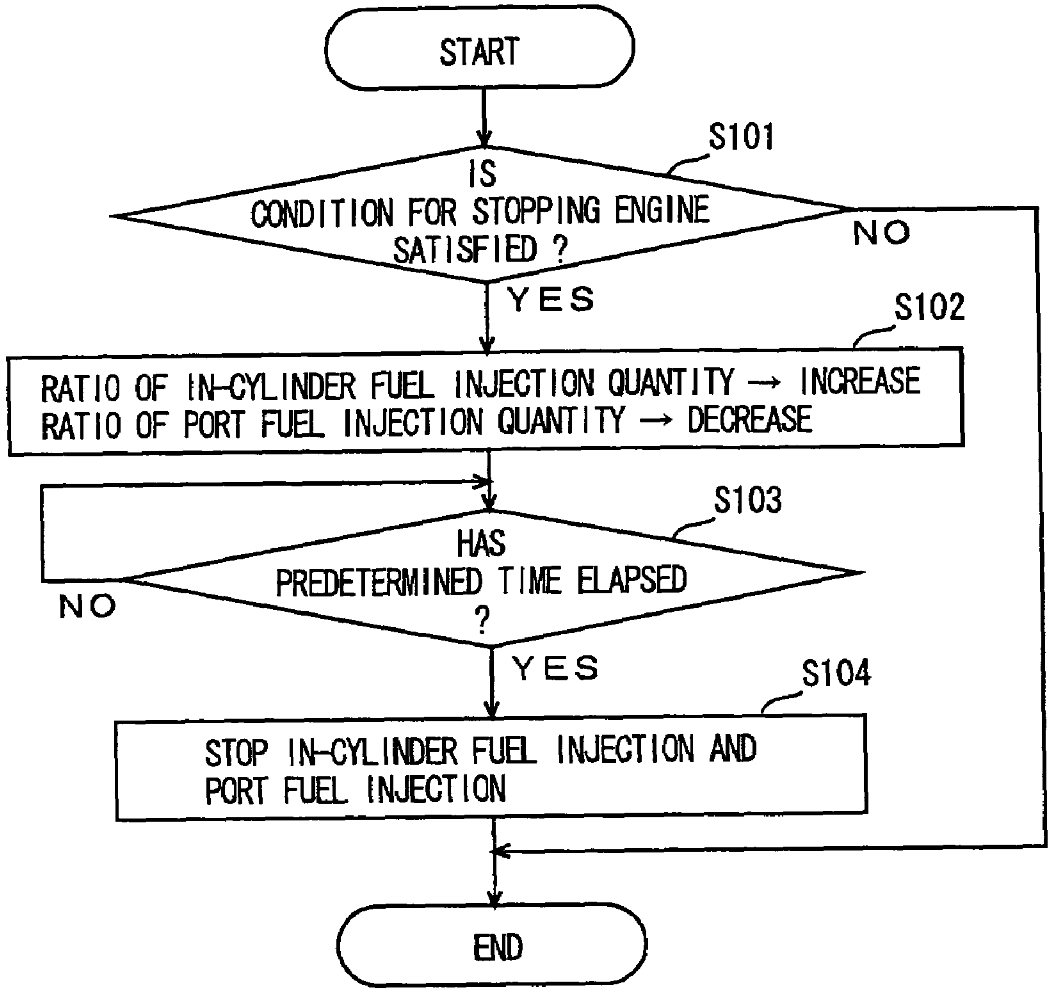
FIG. 2 is a flowchart showing a fuel injection control routine when the internal combustion engine is stopped according to a first embodiment of the present invention.

Fuel injection control when internal combustion engine 1 is stopped according to the present embodiment will now be described with reference to FIG. 2. FIG. 2 is a flowchart showing a fuel injection control routine when internal combustion engine 1 is stopped. The routine is stored in ECU 20 in advance and repeated every predetermined time for execution.

In the routine, initially at S101, ECU 20 determines whether the condition for stopping internal combustion engine 1 is satisfied or not. An example of the condition for stopping internal combustion engine 1 may be turn-off of ignition by the driver. If internal combustion engine 1 is applied to the eco-run system or the hybrid system, an example of the condition for stop may be an automatic stop condition in these systems. If it is determined as YES at S101, ECU 20 proceeds to S102. On the other hand, if it is determined as NO, ECU 20 ends execution of the routine.

At S102, ECU 20 increases a ratio of the in-cylinder fuel injection quantity to the total fuel injection quantity than before the condition is satisfied, and decreases a ratio of the port fuel injection quantity to the total fuel injection quantity than before the condition is satisfied. An increment of the in-cylinder fuel injection quantity and a decrement of the port fuel injection quantity may be set in advance, or may be varied in accordance with a present running state of internal combustion engine 1.

Thereafter, ECU 20 proceeds to S103, and determines whether or not the predetermined time has elapsed since the change in the ratio of the in-cylinder fuel injection quantity and the port fuel injection quantity. The predetermined time may be a time set in advance such that an actual time period required for internal combustion engine 1 to stop is within a tolerable range (for example, 0.5 second). Alternatively, the predetermined time may be a time at which the quantity of fuel adhered to intake port 4 can be determined as not larger than a predetermined quantity. If it is determined as YES at S103, ECU 20 proceeds to S104. On the other hand, if it is determined as NO, ECU 20 repeats S103.

At S104, ECU 20 stops fuel injection from in-cylinder fuel injection valve 10 and port fuel injection valve 11, and ends execution of the routine.

According to the present embodiment, internal combustion engine 1 is stopped only after the port fuel injection quantity is decreased. In addition, internal combustion engine 1 continues to run until the predetermined time has elapsed since decrease in the port fuel injection quantity. Accordingly, during a period from a time point when the condition for stopping internal combustion engine 1 is satisfied until the predetermined time has elapsed, some fuel that has adhered to intake port 4 can flow into cylinder 2. Therefore, the quantity of fuel adhered to intake port 4 when internal combustion engine 1 is stopped can be reduced, and deterioration in emission can be suppressed.

Second Embodiment

A second embodiment of method and apparatus for controlling fuel injection in an internal combustion engine according to the present invention will now be described. As the overall configuration of the internal combustion engine and the fuel supply system thereof according to the present embodiment is similar to that in the first embodiment described above, detailed description thereof will not be repeated.

<Fuel Injection Control 2 when Engine is Stopped>

Figure 3:
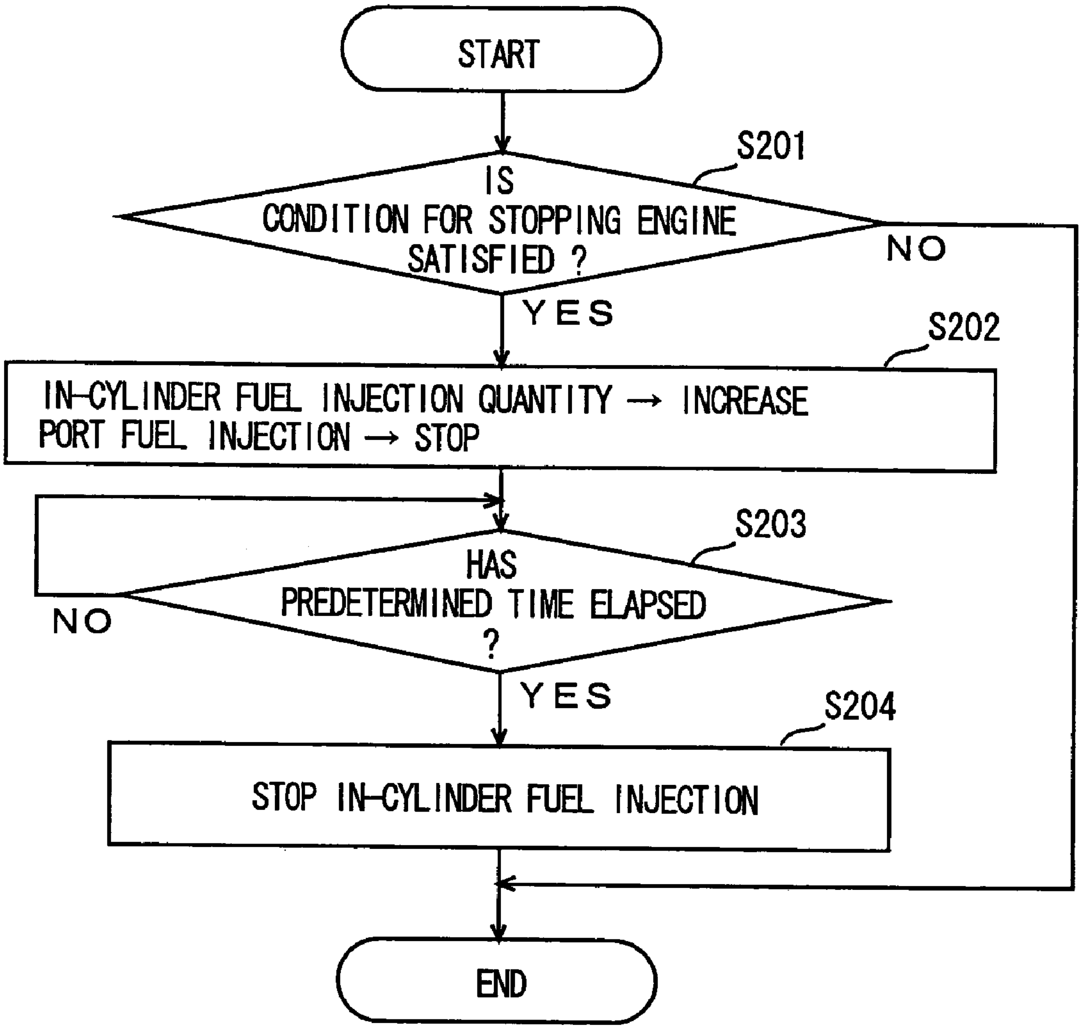
FIG. 3 is a flowchart showing a fuel injection control routine when the internal combustion engine is stopped according to a second embodiment of the present invention.

Fuel injection control when internal combustion engine 1 is stopped according to the present embodiment will now be described with reference to FIG. 3. FIG. 3 is a flowchart showing a fuel injection control routine when internal combustion engine 1 is stopped. As S201 and S203 in the routine are similar to S101 and S103 in the fuel injection control routine shown in FIG. 2, solely S202 and S204 will be described herein. The routine is again stored in ECU 20 in advance and repeated every predetermined time for execution.

In the routine, if it is determined as YES at S201, ECU 20 proceeds to S202.

At S202, ECU 20 stops fuel injection from port fuel injection valve 11, and increases the quantity of fuel injection from in-cylinder fuel injection valve 10 in order to compensate for the quantity of fuel that has been injected from port fuel injection valve 11. Thereafter, ECU 20 proceeds to S203.

If it is determined as YES at S203, ECU 20 proceeds to S204, in which fuel injection from in-cylinder fuel injection valve 10 is stopped. Thereafter, ECU 20 ends execution of the routine.

According to the present embodiment, further adhesion of the fuel to intake port 4 after the condition for stopping internal combustion engine 1 is satisfied is avoided. Therefore, the quantity of fuel adhered to intake port 4 when internal combustion engine 1 is stopped can further be reduced.

Third Embodiment

A third embodiment of method and apparatus for controlling fuel injection in an internal combustion engine according to the present invention will now be described. As the overall configuration of the internal combustion engine and the fuel supply system thereof according to the present embodiment is similar to that in the first embodiment described above, detailed description thereof will not be repeated.

<Fuel Injection Control 3 when Engine is Stopped>

Figure 4:
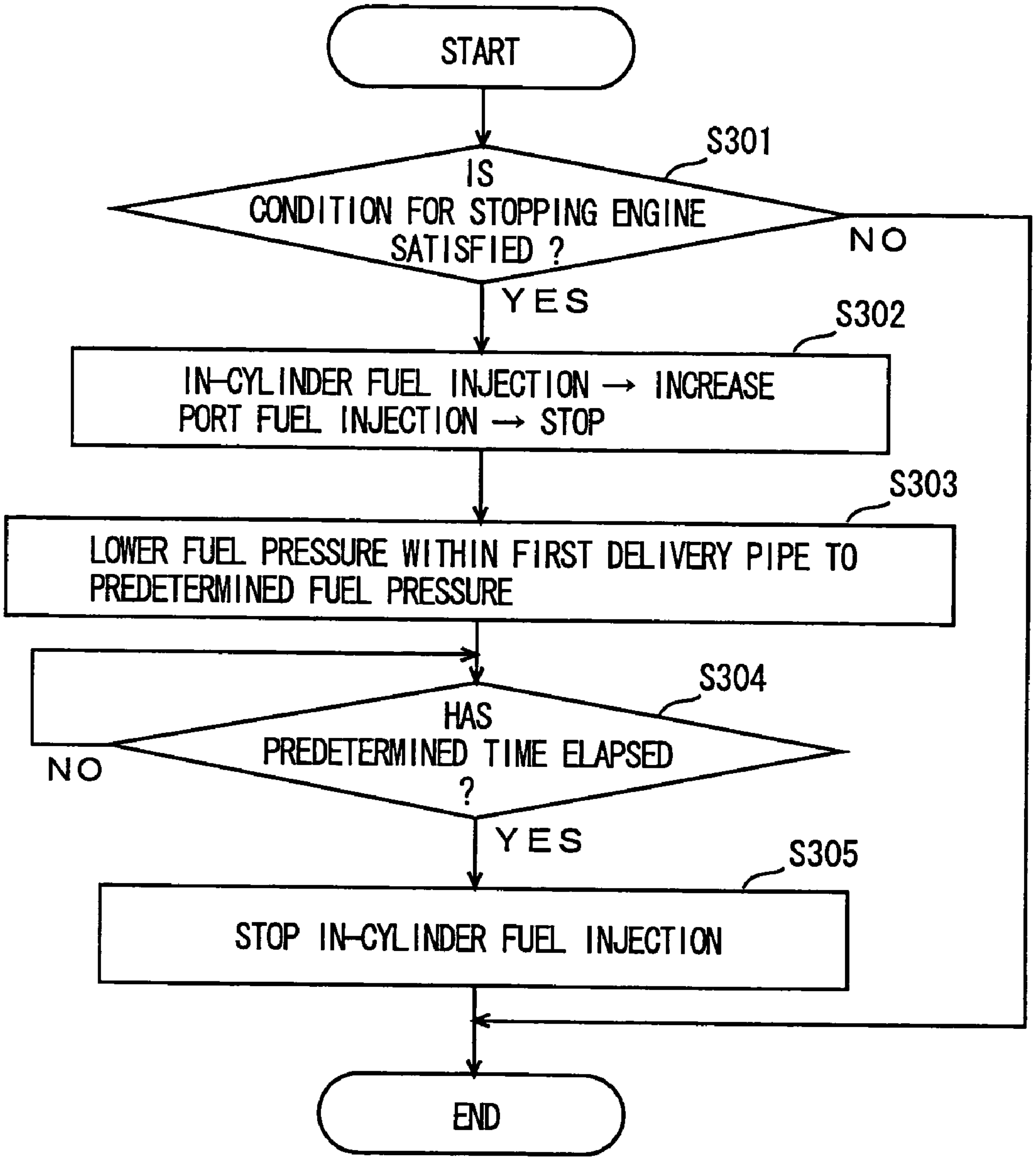
FIG. 4 is a flowchart showing a fuel injection control routine when the internal combustion engine is stopped according to a third embodiment of the present invention.

Fuel injection control when internal combustion engine 1 is stopped according to the present embodiment will now be described with reference to FIG. 4. FIG. 4 is a flowchart showing a fuel injection control routine when internal combustion engine 1 is stopped. As S301, S302, S304, and S305 in the routine are similar to S201, S202, S203, and S204 in the fuel injection control routine shown in FIG. 3, solely S303 will be described herein. The routine is again stored in ECU 20 in advance and repeated every predetermined time for execution.

In the routine, at S302, fuel injection from port fuel injection valve 11 is stopped, and the quantity of fuel injection from in-cylinder fuel injection valve 10 is increased. Thereafter, ECU 20 proceeds to S303.

At S303, ECU 20 lowers the fuel pressure within first delivery pipe 12 down to a predetermined fuel pressure. Here, for example, the quantity of fuel supplied to first delivery pipe 12 may be decreased by lowering a delivery pressure of second fuel pump 17, so as to lower the fuel pressure within first delivery pipe 12. The predetermined fuel pressure refers to a predetermined pressure at which the fuel injected from in-cylinder fuel injection valve 10 can still burn even if the fuel pressure within first delivery pipe 12 is lowered to that predetermined fuel pressure.

After the fuel pressure within first delivery pipe 12 is lowered to the predetermined fuel pressure, ECU 20 proceeds to S304.

According to the present embodiment, the fuel pressure within first delivery pipe 12 after internal combustion engine 1 is stopped can be lowered. Therefore, the quantity of fuel leakage from in-cylinder fuel injection valve 10 after internal combustion engine 1 is stopped can be suppressed. Consequently, deterioration in emission can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling fuel injection in an internal combustion engine including an in-cylinder fuel injection valve for injecting a fuel into a cylinder and a manifold fuel injection valve for injecting a fuel into an intake manifold, comprising the steps of:

when a condition for stopping said internal combustion engine is satisfied, increasing a ratio of a quantity of fuel injected from said in-cylinder fuel injection valve to a total fuel injection quantity than before said condition is satisfied;

decreasing a ratio of a quantity of fuel injected from said manifold fuel injection valve to the total fuel injection quantity than before said condition is satisfied; and stopping fuel injection from said in-cylinder fuel injection valve and said manifold fuel injection valve after a predetermined time has elapsed.

2. The method of controlling fuel injection in an internal combustion engine according to claim 1, comprising the step of:

when said condition is satisfied, lowering a fuel pressure in a fuel supply portion supplying the fuel to said in-cylinder fuel injection valve than a pressure before said condition is satisfied.

3. A method of controlling fuel injection in an internal combustion engine including an in-cylinder fuel injection valve for injecting a fuel into a cylinder and a manifold fuel injection valve for injecting a fuel into an intake manifold, comprising the steps of:

when a condition for stopping said internal combustion engine is satisfied, stopping fuel injection from said manifold fuel injection valve in order to allow fuel injection solely from said in-cylinder fuel injection valve; and stopping fuel injection from said in-cylinder fuel injection valve after a predetermined time has elapsed.

4. The method of controlling fuel injection in an internal combustion engine according to claim 3, comprising the step of:

when said condition is satisfied, lowering a fuel pressure in a fuel supply portion supplying the fuel to said in-cylinder fuel injection valve than a pressure before said condition is satisfied.

5. An apparatus for controlling fuel injection in an internal combustion engine including an in-cylinder fuel injection valve for injecting a fuel into a cylinder and a manifold fuel injection valve for injecting a fuel into an intake manifold, wherein when a condition for stopping said internal combustion engine is satisfied, a ratio of a quantity of fuel injected from said in-cylinder fuel injection valve to a total fuel injection quantity is increased than before said condition is satisfied, a ratio of a quantity of fuel injected from said manifold fuel injection valve to the total fuel injection quantity is decreased than before said condition is satisfied, and fuel injection from said in-cylinder fuel injection valve and said manifold fuel injection valve is stopped after a predetermined time has elapsed.

6. The apparatus for controlling fuel injection in an internal combustion engine according to claim 5, wherein when said condition is satisfied, a fuel pressure in a fuel supply portion supplying the fuel to said in-cylinder fuel injection valve is made lower than a pressure before said condition is satisfied.

7. An apparatus for controlling fuel injection in an internal combustion engine including an in-cylinder fuel injection valve for injecting a fuel into a cylinder and a manifold fuel injection valve for injecting a fuel into an intake manifold, wherein when a condition for stopping said internal combustion engine is satisfied, fuel injection from said manifold fuel injection valve is stopped in order to allow fuel injection solely from said in-cylinder fuel injection valve, and fuel injection from said in-cylinder fuel injection valve is stopped after a predetermined time has elapsed.

8. The apparatus for controlling fuel injection in an internal combustion engine according to claim 7, wherein when said condition is satisfied, a fuel pressure in a fuel supply portion supplying the fuel to said in-cylinder fuel injection valve is made lower than a pressure before said condition is satisfied.

* * * * *